July 7, 1964
G. H. McLAFFERTY
3,140,410
NUCLEAR MAGNETOHYDROELECTRIC GENERATOR
Filed July 22, 1960
2 Sheets-Sheet 1
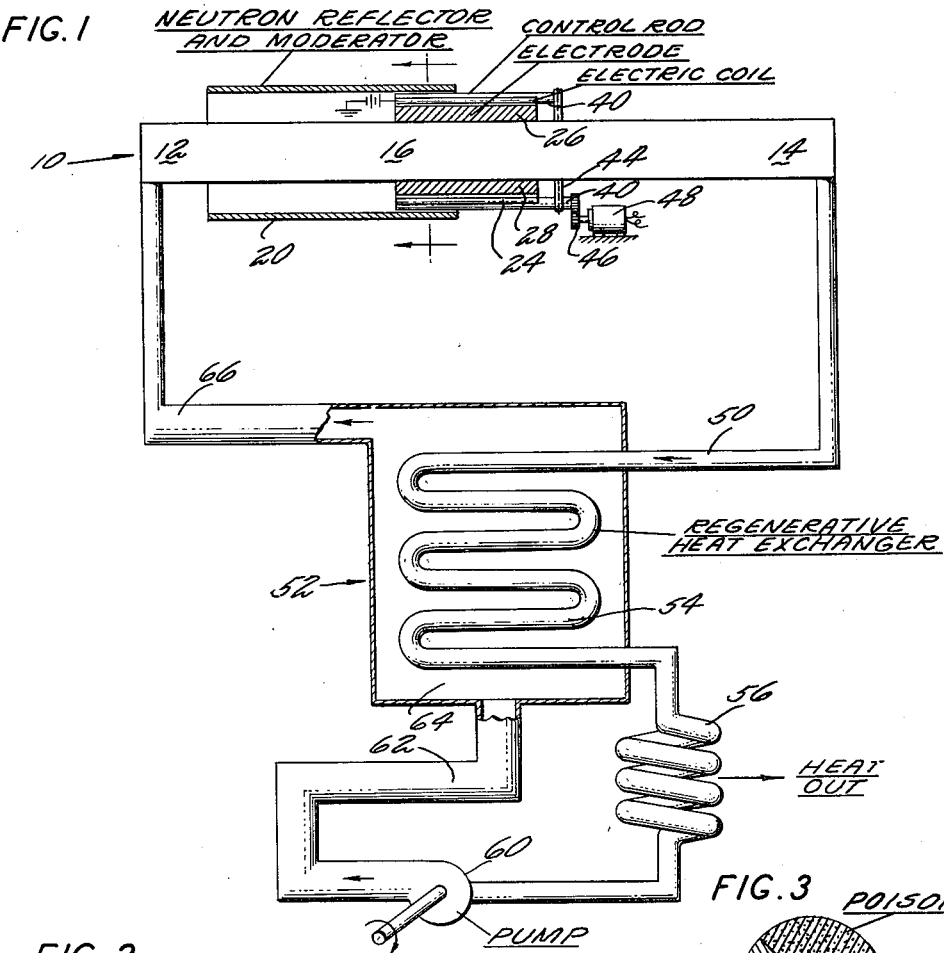
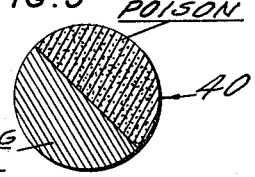
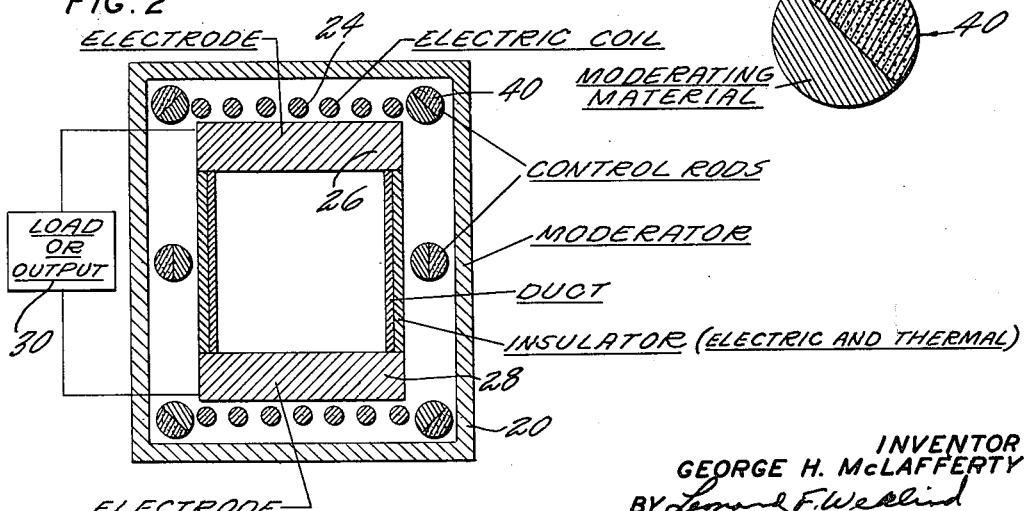
INVENTOR
GEORGE H. McLAFFERTY
BY Leonard F. Werlind
ATTORNEY

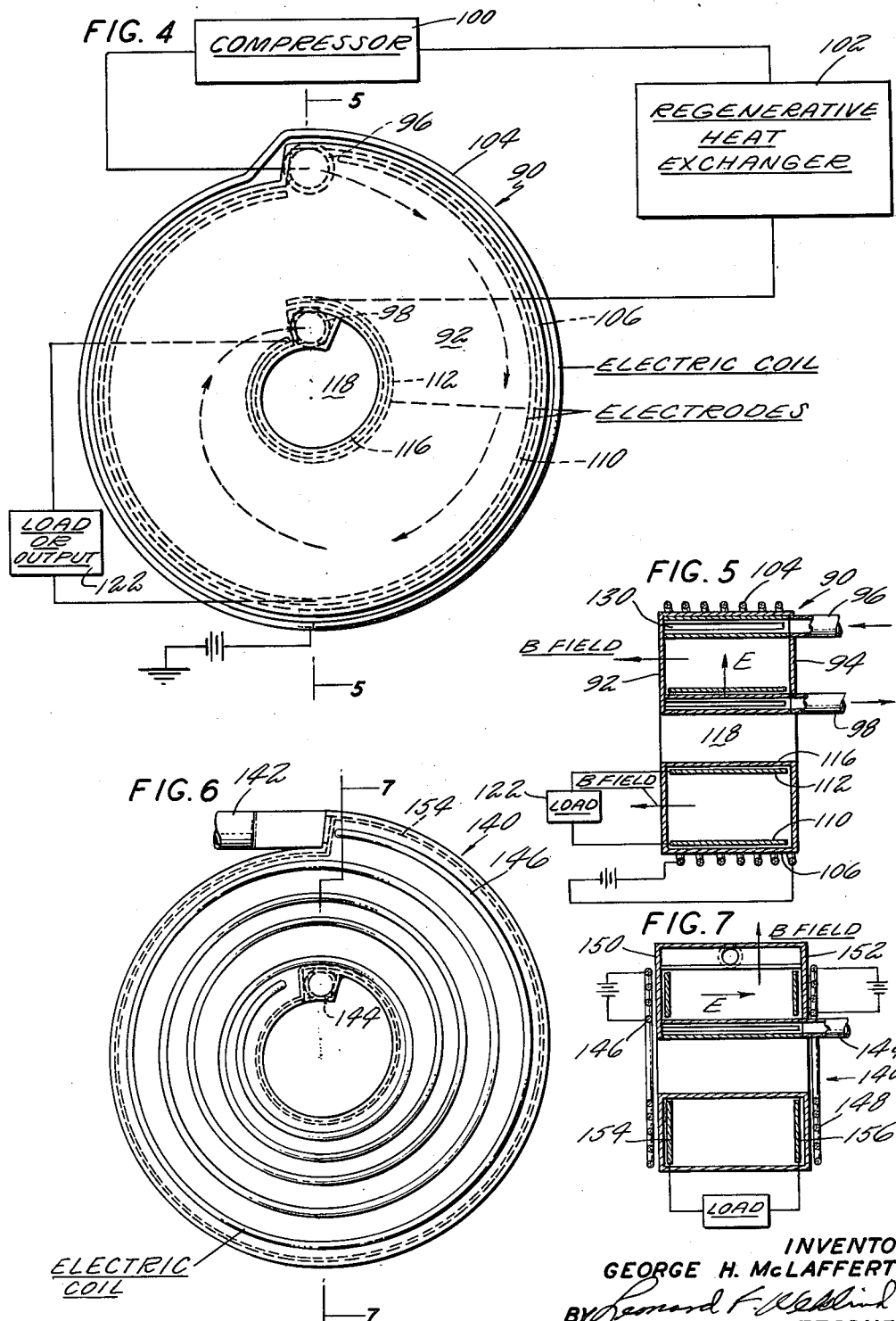

United States Patent Office 3,140,410
Patented July 7, 1964

3,140,410
NUCLEAR MAGNETOHYDROELECTRIC
GENERATOR
George H. McLafferty, Manchester, Conn., assignor to
United Aircraft Corporation, East Hartford, Conn., a
corporation of Delaware
Filed July 22, 1960, Ser. No. 44,601
14 Claims. (Cl. 310—11)

This invention relates to the generation of electrical power directly from an ionized fluid stream passing through a mangetic field.

Generators of this type are commonly referred to as magnetohydroelectric generators. In generators of this type, a relatively hot ionized fluid is passed through a magnetic field so that the fluid acts as a conductor crossing lines of force, thereby producing electrical power. These generators are limited in their maximum efficiency and power output by the maximum temperature which can normally be obtained from the combustion of a fuel or the temperature normally attained from a solid-core nuclear reactor.

It is therefort an object of this invention to overcome this temperature limitation by raising the temperature of the working fluid by suitable nuclear fission of a material which is contained in the working fluid. The fissionable material is caused to "go critical" in a particular region of the system, and the conversion to electrical power is made in the immediate vicinity of the nuclear reaction.

It is therefore a primary object of this invention to provide a magnetohydroelectric generator utilizing nuclear energy whereby fission takes place only in the portion of the cycle where electric power is being extracted from the system or in the portion of the cycle immediately upstream of the power generator.

These and other objectives of this invention will become readily apparent from the following detailed description of the drawings in which:

FIG. 1 is a schematic illustration of a magnetohydroelectric generator system according to this invention;

FIG. 2 is an enlarged detail cross section of a typical reactor-electric ion region;

FIG. 3 is an enlarged detail of a typical moderating control rod;

FIG. 4 is a modified arrangement of a unit having a vortex flow;

FIG. 5 is a section taken along the line 5—5 of FIG. 4;

FIG. 6 is a further modified vortex flow arrangement; and

FIG. 7 is a section taken along the line 7—7 of FIG. 6.

Referring to FIG. 1, a main fluid duct is generally indicated at 10 as having an inlet 12 and an outlet 14. The duct 10 is adapted to have a working fluid flowing therethrough from the inlet side 12 to the outlet side 14. The working fluid must be in a gaseous state in the intermediate generator region 16. The working fluid in the remaining part of the system may be in a liquid state, however, in any event, the working fluid contains suitable fissionable material, such as uranium or a uranium compound in a solid, liquid or gaseous form. The fluid may include seeding materials such as various potassium compounds to enhance ionization.

A neutron reflector moderator 20 extends over a predetermined length of the duct 10 and surrounds the latter so as to reflect neutrons and cause the system to "go critical" and thereby generate the high temperature necessary to cause ionization so that the working fluid becomes a conductor.

In describing the elements of the reactor generator, reference may also be had to FIG. 2. In order to generate the necessary electrical power, a coil 24 has its wires running parallel to the axis of the fluid flow so that it generates magnetic lines of force which pass transversely of the path of fluid in the region where power is generated. As is obvious to those skilled in the art, the electric current runs from left to right in the top coil of FIG. 1, passes around the device to the bottom coil in FIG. 1, then passes from right to left in the bottom coil in FIG. 1, and then passes back to the power source. The resulting magnetic field would be in a direction from right to left in the sketch in FIG. 2. The power for the coils also would be tapped off of the power coming from the electrodes which is conventional for MHD systems. As the conductive fluid passes through this region, electrical power is generated such that a potential occurs across the electrodes 26 and 28. The wires of coil 24 may be located inside or outside the moderator 20. These are more clearly shown in FIG. 2 and the electrodes are schematically illustrated as being connected to a suitable load or output 30.

In order to control the output of heat energy and electrical energy produced, a plurality of control rods 40 are provided and are composed of a poison material and a moderating material as shown in FIG. 3. The poison material may be, for example, cadmium or boron, while the moderating material may be graphite, beryllium oxide or beryllium in a suitable state. These rods 40 (FIG. 1) may be connected by a suitable chain drive 44 and through a gear arrangement 46 to a suitable control motor 48.

It will be evident that when these rods are rotated, more or less of the moderating material or poison will face the fluid stream so as to increase or decrease the rate of fission in the region where electrical power is being generated.

The working fluid is cooled after it has passed from the outlet 14 and duct 50 by passage to a suitable regenerative heat exchanger having coils 54. The cooled fluid (gas or liquid) then passes through a heat exchanger 56, which is only schematically illustrated herein but may be any suitable convective, radiant or other heat rejection element. In outer space this could take the form of a space radiator.

The working fluid then passes through a suitable pump or compressor 60 which circulates the liquid or gas through the pipe 62 and the chamber 64 through the heat exchanger 52, thus providing a regenerative heat exchanger arrangement. During this heat exchange, the fluid is preheated in the chamber 64 to a suitable state whereby it passes through the duct 66 to the inlet 12, where the fission material will increase the temperature of the fluid in that region to insure complete ionization and gasification.

It should be noted that the generating portion of the system is in the immediate vicinity of the nuclear fission region, and in fact, these two regions may overlap, as shown, or may be completely coincidental with respect to the axis of flow through the duct 10.

Referring to FIGS. 4 and 5, a modified generator is schematically illustrated. Thus, the main generator region may assume the shape of a drum-like device 90 having end walls 92 and 94, respectively, with inlet and outlet pipes 96 and 98, respectively. The usual compressor 100 and regenerative heat exchanger 102 (FIG. 4) are utilized in a manner substantially identical to that shown in FIG. 1. An electrical coil 104 surrounds the outer wall 106 of the drum-like casing, while two cylindrical electrodes 110 and 112 are located adjacent to the outside of the wall 106 and adjacent the inner wall 116 of the casing, respectively. The inner cylindrical wall 116 forms a through opening 118 in the center of the casing 90. A suitable load 122 is provided across the two electrodes.

The flow of working fluid enters through the inlet 96 and exits through a suitable elongated slot 130 (FIG.

5) and begins a vortex or circular motion on the inside of the drum 90 for eventual exit out the pipe 98. In its swirling motion around the drum passage, the nuclear fuel-bearing working fluid passes through the field generated by the coil 104 and induces an electrical current which flows across the electrodes 110 and 116.

FIGS. 6 and 7 indicate a modified arrangement of a drum-like casing 140 which operates very similarly to the FIGS. 4 and 5 arrangement. Thus, an inlet 142 and outlet 144 are provided. In this instance, the coils 146 and 148 are formed in doughnut-like fashion and arranged on either side of the drum faces 150 and 152. Doughnut-shaped electrodes 154 and 156 are similarly disposed with respect to the casing 140.

With the configuration shown in FIGS. 4 through 7, a more compact arrangement can be provided with the working fluid taking a circuitous path in a relatively confined volume.

By having the overlapped arrangement of the fission and generating regions, the temperature rise caused by the nuclear fission process is compensated for by the temperature drop caused by the removal of energy from the fluid in the form of electricity.

The particular arrangement of the fission region and the electrical generating region may also provide a second advantage in that the gasified fluid may be heated to the point of being ionized and, hence, conductive only after it has passed the point where the electrodes begin, thereby avoiding short circuits.

The particular parameters of operation necessary for practicing this invention may be of values suitably chosen. Reference may be had to the following reference publications.

Safonov, G.: "Externally Moderated Reactors," Rand Corp. Report R-316, July 1957.

Sutton, George: "Design Considerations of a Steady D.C. Magnetohydrodynamic Power Generator," General Electric Aeroscience Laboratories Report No. TIS-R59 SD 432, September 1959.

Rosa, Richard J. and Arthur Kantrowitz: Chapter 11 entitled "Magnetohydrodynamic Energy Conversion Techniques," of textbook entitled "Direct Conversion of Heat to Electricity," issued July 1959 by Massachusetts Institute of Technology in connection with a special summer program.

It will be apparent that as a result of this invention, a highly efficient, high temperature magnetohydroelectric generator has been provided, which will efficiently convert power directly into electrical energy, and wherein fission takes place in the flow system substantially adjacent the region where electrical power is being extracted, i.e., upstream of the power generator, or in overlapping or coincidental relationship therewith. Therefore the system can be made more compact and lighter in weight. Furthermore, the device in the region of power variation can be operated at a more near constant temperature, thereby increasing the efficiency of the conversion process and in reducing the wall heat problem. In other generators the temperature normally drops during the power extraction process. This requires having the gas enter at a high temperature of a value which is sufficient for cognization, and which the structure can tolerate. Then the temperature keeps dropping. However, with this device, the continuous nuclear reaction can be adjusted so that a fairly high temperature can be maintained throughout the power generating process to add heat at substantially the same rate that is being removed during power generation. The system can then operate near the maximum tolerable, from a structural standpoint.

Although one embodiment of this invention has been illustrated and described, it will be apparent that various changes and modifications may be made in the construction and arrangement of the various parts without departing from the scope of this novel concept.

What it is desired by Letters Patent is:

1. A magnetohydroelectric generator comprising a duct having an inlet and outlet, means for moving a fluid stream through said duct including pump means, said fluid stream including a fissionable material dispersed therethrough, moderator means surrounding said duct and extending a predetermined distance along the path of fluid flow, means providing magnetic lines of force running transversely of the path of flow, electrode means positioned adjacent said duct in substantially juxtaposed relation with said moderator means, and means receiving electrical current from said electrodes.

2. A generator according to claim 1 including a condenser connected to said outlet and to said pump means.

3. A generator according to claim 2 including means for controlling the rate of fission and the electrical output at said electrodes.

4. A magnetohydroelectric generator comprising a duct having a inlet and an outlet, means for moving a fluid stream through said duct, said fluid stream including a fissionable material dispersed therethrough, moderator means surrounding said duct and extending a predetermined distance along the path of fluid flow, means providing magnetic lines of force running transversely of he duct and extending substantially along said predetermined distance electrode means positioned adjacent said duct in substantially juxtaposed relation with said moderator means whereby the electrode means overlaps at least a portion of said moderator means.

5. A generator according to claim 4 wherein said means for moving comprises pump means for circulating said fluid from said outlet to said inlet.

6. A magnetohydroelectric generator comprising a duct having an inlet and an outlet, a fluid stream in said duct, said fluid stream including a fissionable material dispersed therethrough, moderator means surrounding said duct and extending a predetermined distance along the path of fluid flow, means providing magnetic lines of force running transversely of the flow of fluid, electrode means positioned adjacent said duct in substantially juxtaposed relation with said moderator means, control means for varying the rate of fission, a heat exchanger connected to the outlet end of said duct for cooling said fluid, pump means of pumping the cooled fluid in heat-exchange relation through said heat exchanger including an outlet passage, means for conducting said cooled fluid from said passage to said inlet, and a radiator in the fluid path for rejecting heat.

7. A magnetohydroelectric generator comprising a casing having an inlet and outlet, means for moving a working fluid stream from said inlet to said outlet and through said casing including moving the fluid in a circuitous path, said fluid stream including a fissionable material, means adjacent said casing for causing a reaction of said fissionable material, electrode means located adjacent said casing, means for generating a magnetic field within at least a portion of said casing, and means for receiving electrical energy from said electrode means.

8. A generator according to claim 7 wherein said casing includes an annular chamber in which the working fluid is circulated in a vortex-like path.

9. A generator according to claim 8 wherein said casing is of doughnut-like shape and includes side walls and inner and outer curved walls.

10. A generator according to claim 9 wherein said electrode means comprises curved plates located adjacent each of said inner and outer walls.

11. A generator according to claim 9 wherein said electrode means comprises annular plates located adjacent each of said side walls.

12. A magnetohydroelectric generator comprising a casing having an inlet and outlet, means for moving a fluid stream from said inlet to said outlet and through said casing in a circuitous path, said fluid stream including a fissionable material, means adjacent said casing for causing a reaction of said fissionable material, electrode means having a curved shape located adjacent said casing, means for generating a magnetic field in said casing position adjacent said casing and said electrode means, and means for receiving electrical energy from said electrode means.

13. A generator according to claim 12 wherein said casing forms an annular chamber connected to said inlet and outlet and said means for generating a magnetic field surrounds said chamber.

14. A generator according to claim 12 wherein said casing forms a curved annulus-like chamber and said means for generating a magnetic field is located adjacent said side walls.

References Cited in the file of this patent

UNITED STATES PATENTS 2,728,867    Wilson    Dec. 27, 1955
2,817,776    Cohen    Dec. 24, 1957

OTHER REFERENCES

August 1957, Nucleonics, pp. 50–55.
Westinghouse Engineer, July 1960 issue (pp. 105–107).